United States Patent

[11] 3,592,956

[72] Inventor Frank W. Fork
 Allison Park, Pa.
[21] Appl. No. 822,390
[22] Filed May 7, 1969
[45] Patented July 13, 1971
[73] Assignee H. H. Robertson Company
 Pittsburgh, Pa.

[54] ELECTRICAL RACEWAY WIRING DISTRIBUTION SYSTEM
 12 Claims, 17 Drawing Figs.

[52] U.S. Cl. .................................................. 174/49,
 52/221, 138/92, 138/115, 174/96, 174/97,
 174/101, 220/3.94
[51] Int. Cl. ..................................................... H02g 3/28,
 E04f 19/08
[50] Field of Search ........................................ 174/48, 49,
 50, 51, 53, 57, 68 C, 70 C, 71 R, 72 R, 72 C,
 95—98, 101; 138/92, 103, 105, 111, 115, 116,
 117; 52/221; 220/3.2, 3.3, 3.4, 3.94

[56] References Cited
 UNITED STATES PATENTS

| | | | |
|---|---|---|---|
| 2,073,490 | 3/1937 | Lewin............................ | 174/96 UX |
| 2,132,400 | 10/1938 | Curren ......................... | 174/72 C |
| 3,303,264 | 2/1967 | Saul et al. .................... | 174/48 |
| 3,417,191 | 12/1968 | Fork.............................. | 174/96 X |
| 3,453,791 | 7/1969 | Fork.............................. | 174/49 X |

FOREIGN PATENTS

| | | | |
|---|---|---|---|
| 1,095,345 | 12/1960 | Germany...................... | 174/97 |

*Primary Examiner*—Laramie E. Askin
*Attorney*—Harry B. Keck

ABSTRACT: An electrical wiring distribution system including a metal raceway section having at least two parallel cells and an intermediate trough. Improved capping means is provided for enclosing the intermediate trough to provide an additional unobstructed electrical passageway. The present improvement increases the wire carrying capacity of the raceway section; utilizes a region of the metal raceway section which heretofore has been unavailable; provides separate raceways for power, telephone and signal conductors; and permits access to all three separate cells at each of plural locations in metal raceway section.

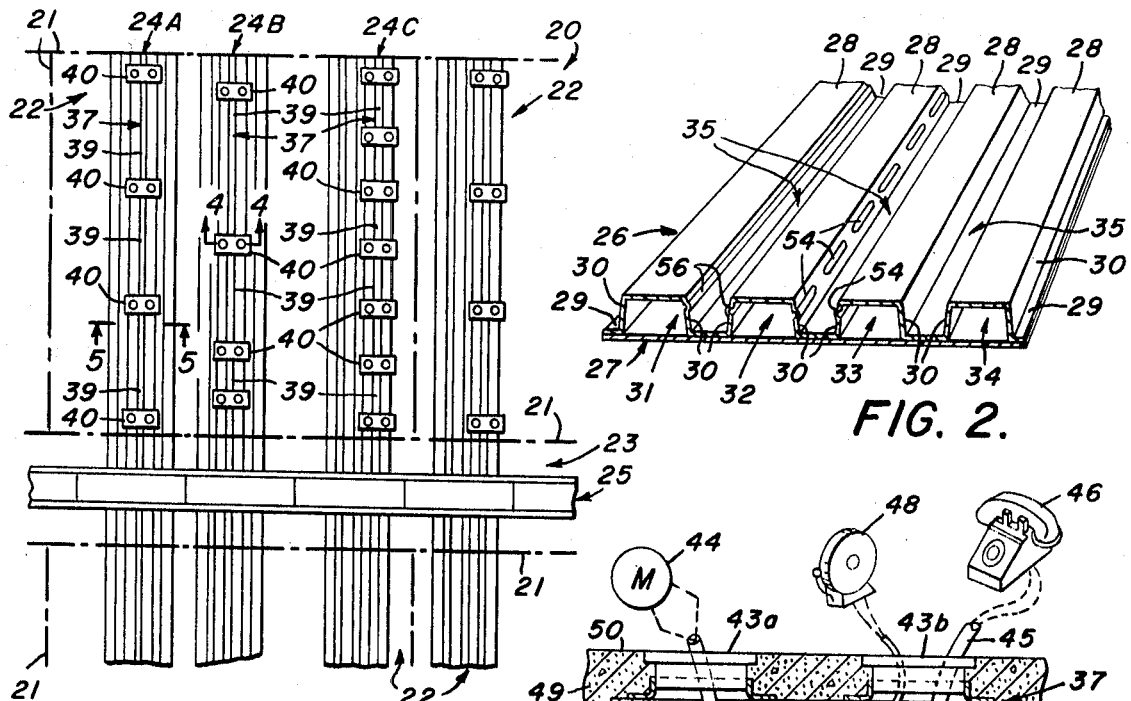
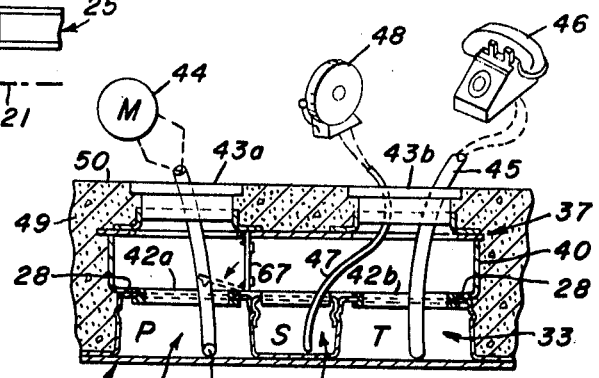
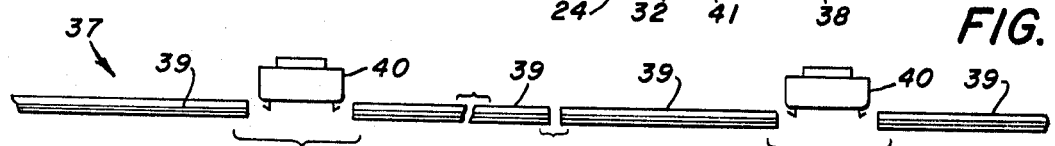
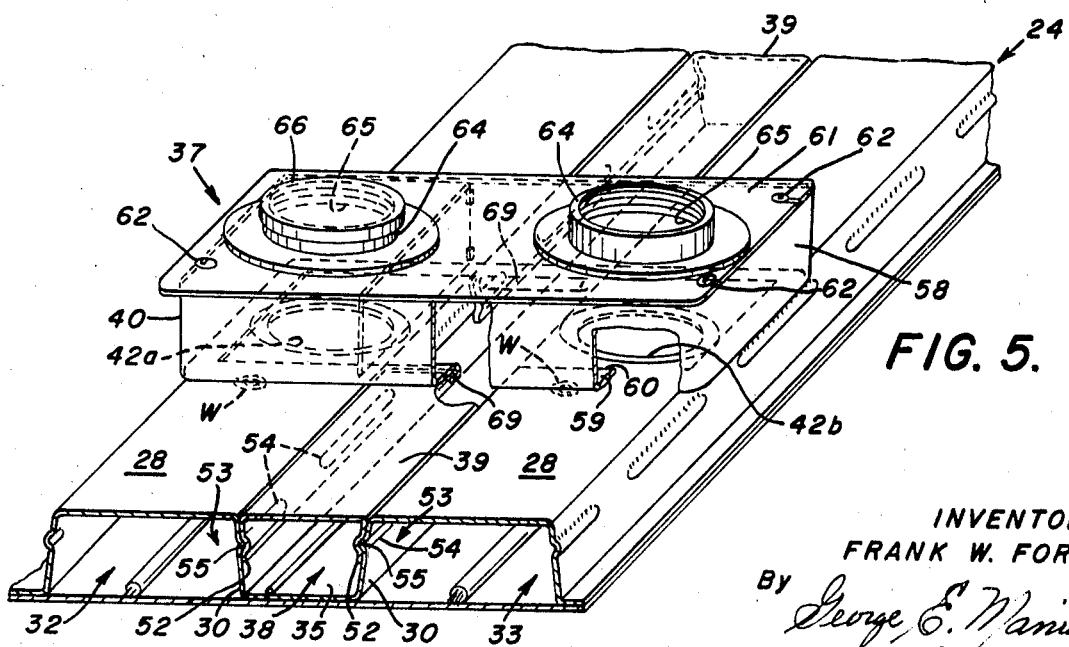
INVENTOR.
FRANK W. FORK

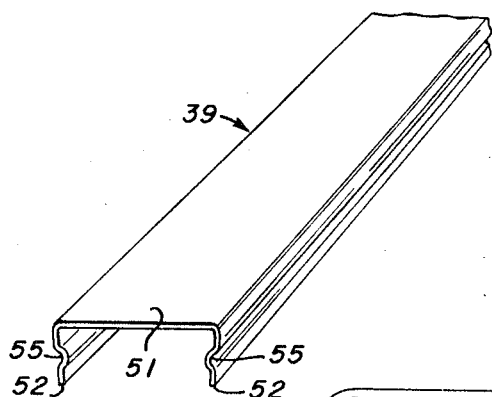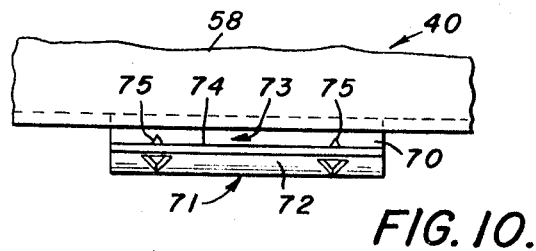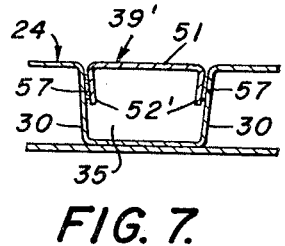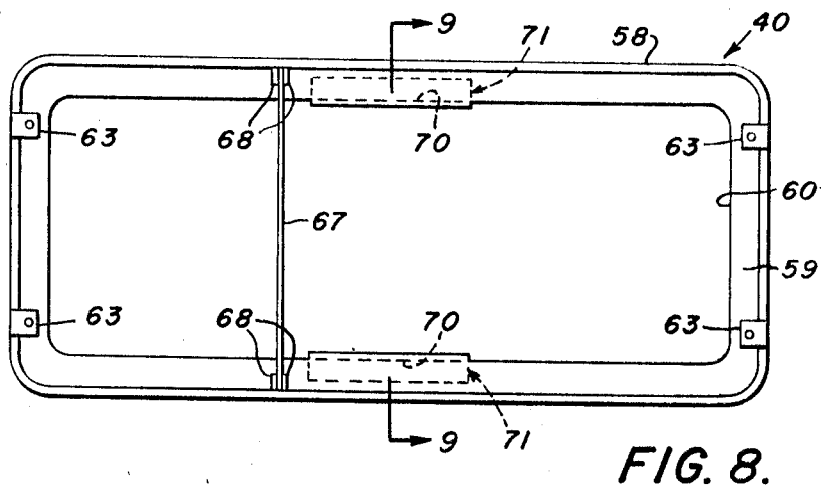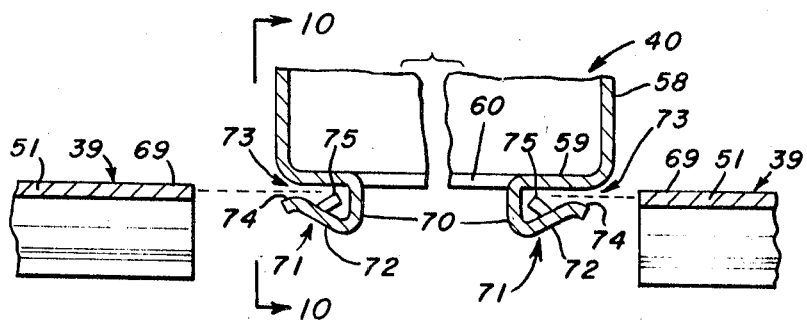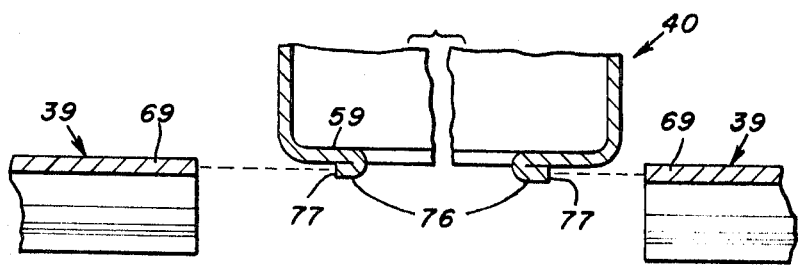

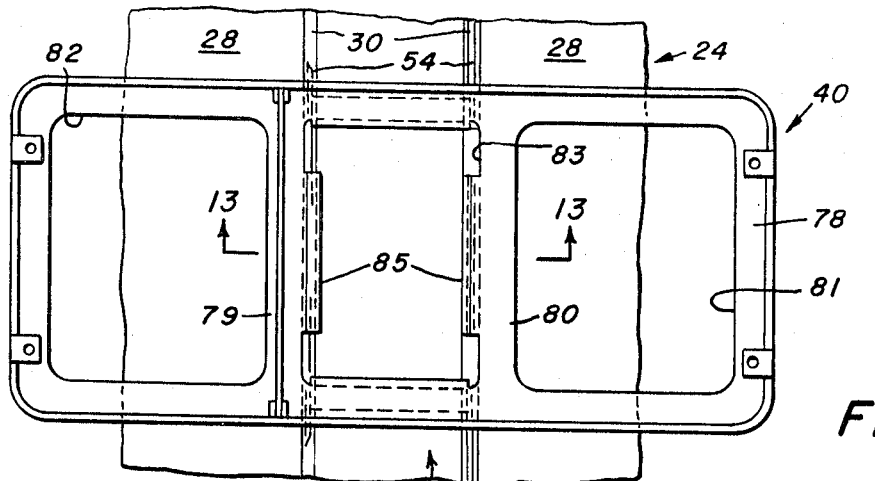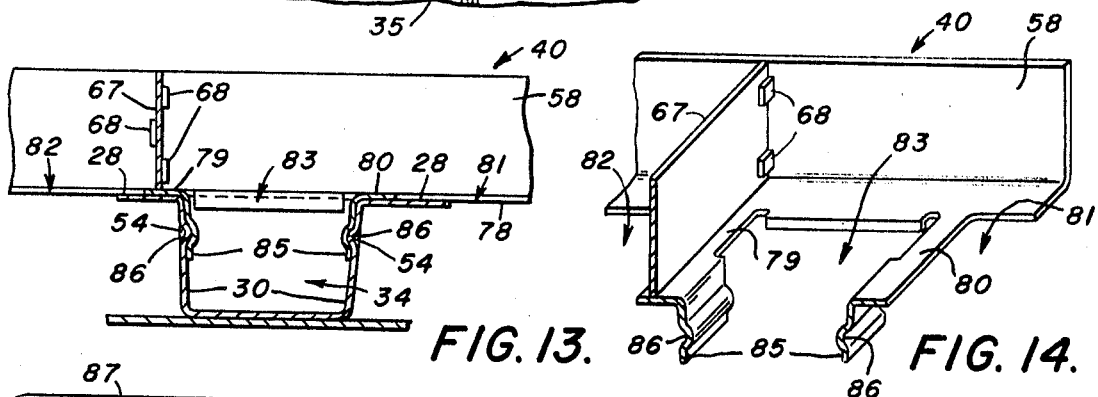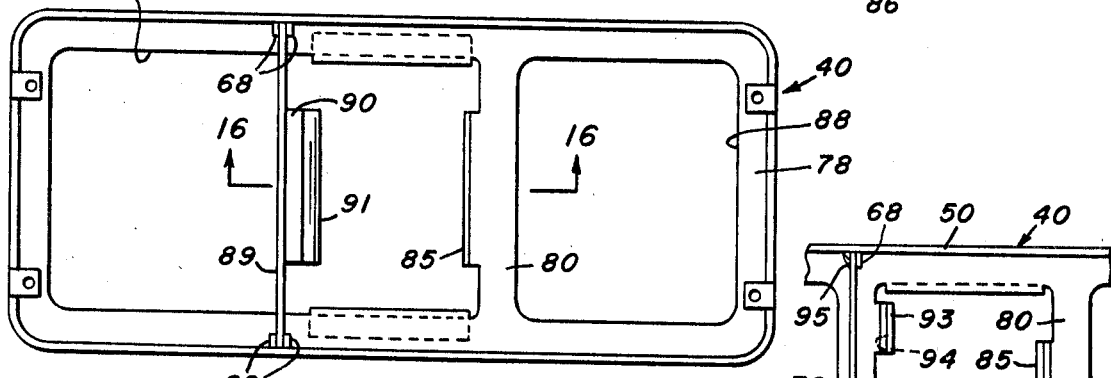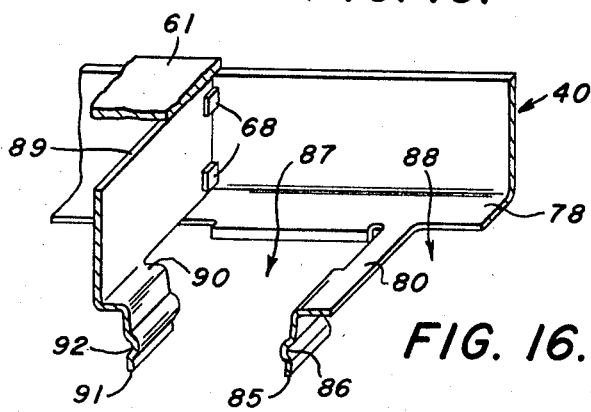

3,592,956

ELECTRICAL RACEWAY WIRING DISTRIBUTION SYSTEM

BACKGROUND OF THE INVENTION

1. Field of the Invention

This invention relates to an electrical wiring distribution system including a metal raceway section which is adapted to be embedded in concrete and which presents alternating enclosed cells and troughs, and more particularly to capping means for enclosing a trough to provide an additional, unobstructed electrical passageway.

2. Description of the Prior Art

Metal cellular raceway sections providing alternating enclosed cells and troughs are known in the prior art. See for example U.S. Pat. No. 3,426,802. The adjacent cells of such units have been used to convey power and telephone conductors. Access to the interiors of the adjacent cells have been provided by openings in the sidewalls of the adjacent cells. An insert extending above the cells and extending downwardly into the trough between the adjacent cells provides access to the conductors in the cells from the floor level. See for example, U.S. Pat. No. 3,417,191.

Floor structures are also available, which incorporate corrugated sheets supported on structural beams and laid in edge-overlapping relation. Such corrugated sheets include relatively wide channels which may be enclosed by the addition of closure elements to provide electrical passageways. The closures may be provided with openings which receive surface outlet tubes having an open top at the level of the finished floor. The outlet tubes provide access to the conductors in the passageway from the finished floor level. Such a floor structure is illustrated in U.S. Pat. No. 2,912,848.

SUMMARY OF THE INVENTION

The principal object of this invention is to provide improved capping means for enclosing a trough of a metal raceway section, to provide an additional unobstructed electrical passageway disposed between adjacent cells of the metal raceway section.

A further object of this invention is to provide improved capping means comprising cover strips and chamber-defining members, such as enclosures, wherein the spacing between successive enclosures may be varied to suit the requirements of electrical distribution in the finished floor structure.

Still another object of this invention is to provide improved means for securing and electrically grounding the cover strips and enclosures to the metal raceway section.

A further object of this invention is to utilize those regions of metal raceway sections which heretofore have been unavailable.

The present invention provides improvement in a metal raceway section of the type adapted to be embedded in a concrete floor construction. The metal raceway section has at least a pair of spaced, generally parallel cells presenting spaced-apart crests, an intermediate valley and confronting sidewalls connecting the crests to the intermediate valley. The confronting sidewalls and the valley define a lengthwise trough.

In accordance with the present invention, capping means is provided for enclosing the trough to provide an additional unobstructed electrical passageway disposed between the enclosed cells. The capping means comprises plural cover strips and at least one chamber-defining member interposed between the ends of a pair of the cover strips.

The cover strips may include a central pan and longitudinal side portions depending into the lengthwise trough. Connector means is provided for securing and for electrically grounding the cover strips to the metal raceway section.

The chamber defining members extend above the spaced-apart crests, span across the lengthwise trough and overlie the spaced-apart crests, and have a dimension in the direction of the lengthwise trough which is at least equal to the distance between the spaced-apart crests. In the preferred arrangement, the chamber defining member comprises an enclosure having a bottom wall overlying the spaced-apart crests. The bottom wall is provided with at least one opening exposing the spaced-apart crests to the interior of the enclosure and providing communication between the interior of the lengthwise trough and the interior of the enclosure.

BRIEF DESCRIPTION OF THE DRAWINGS

FIG. 1 is a fragmentary plan view of a building floor, schematically illustrating room and corridor spaces and further illustrating plural metal raceway sections provided with the capping means of this invention;

FIG. 2 is an isometric end view of a typical metal raceway section;

FIG. 3 is a side view, in exploded form, of the capping means of this invention;

FIG. 4 is a cross-sectional view taken along the line 4—4 of FIG. 1, illustrating a metal raceway section provided with the capping means of this invention, embedded in concrete;

FIG. 5 is a fragmentary isometric view, as viewed from the line 5—5 of FIG. 1, illustrating on an enlarged scale an intermediate electrical passageway formed by the addition of the capping means of this invention to a metal raceway section;

FIG. 6 is a fragmentary isometric view of a cover strip;

FIG. 7 is a cross-sectional view taken transversely through the intermediate electrical passageway, illustrating alternative means for connecting the cover strip to the metal raceway section;

FIG. 8 is a plan view of the enclosure of FIG. 5, with its cover removed;

FIG. 9 is a cross-sectional view taken along the line 9—9 of FIG. 8, illustrating combined cover strip stop means and connector means for connecting the enclosure to the adjacent cover strips;

FIG. 10 is a cross-sectional view taken along the line 10—10 of FIG. 9;

FIG. 11 is a cross-sectional view, similar to FIG. 9, illustrating alternative cover strip stop means;

FIG. 12 is a plan view, similar to FIG. 8, illustrating an enclosure having alternative connector means for connecting the enclosure to a metal raceway section;

FIG. 13 is a cross-sectional view, taken along the line 13—13 of FIG. 12;

FIG. 14 is a fragmentary isometric view, partly in cross section, further illustrating the enclosure and connector means of FIGS. 12, 13;

FIG. 15 is a plan view, similar to FIG. 12, illustrating an enclosure having further alternative connector means for connecting the enclosure to a metal raceway section;

FIG. 16 is a fragmentary isometric view further illustrating the enclosure and connector means of FIG. 15; and FIG. 17 is a fragmentary plan view, similar to FIG. 12, illustrating an enclosure having a still further alternative connector means for connecting the enclosure to a metal raceway section.

DESCRIPTION OF THE PREFERRED EMBODIMENT(S)

FIG. 1 illustrates a floor plan of a building floor 20 wherein walls schematically indicated by the dash-dot lines 21, define rooms 22 and a corridor 23. The floor plan is superimposed over plural metal raceway sections 24A, 24B and 24C. The metal raceway sections 24 are arranged in a typical spaced, generally parallel relation. An electrical trench header 25 provided in the corridor 23, communicates with the cells of the metal raceway sections 24 for distributing electrical wiring throughout the floor area.

As shown in FIG. 2, a typical metal raceway section 24 includes a corrugated upper metal sheet 26 and a correlative lower metal sheet 27. The upper metal sheet 26 presents spaced-apart crests 28 and valleys 29 and generally vertical sidewalls 30 connecting adjacent ones of the crests 28 and valleys 29. The correlative lower metal sheet 27 is secured to the upper metal sheet 26 along contiguous portions thereof. The lower metal sheet 27 cooperates with the crests 28 and the sidewalls 30 to form spaced, generally parallel cells 31, 32, 33 and 34. The confronting sidewalls 30 and the adjoining valley 29 of each pair of adjacent cells 31, 32 or 32, 33 or 33, 34, cooperate to define lengthwise troughs 35.

Reference is directed to FIGS. 1, 3 and 5. In accordance with the present invention, each of the metal raceway sections 24 is provided with capping means 37 for enclosing a selected one of the troughs 35 to provide an additional unobstructed electrical passageway 38 intermediate the adjacent cells 32, 33. The capping means 37 comprises plural cover strips 39 and at least one and preferably a plurality of chamber defining members, such as enclosures 40. Each of the enclosures 40 is interposed between the ends of a pair of adjacent cover strips 39. As will be more fully described, the enclosures 40 provide access from the finished floor level to conductors carried by a selected pair of the cells 31, 32, 33, 34 and the intermediate passageway 38.

The cover strips 39 may be cut to length in the factory or in the field. The number and length of the cover strips 39 employed determines the spacing between successive enclosures 40. The spacing between successive enclosures 40 may be uniform or nonuniform—compare the metal raceway sections 24A and 24B—and may be relatively small or large—compare the metal raceway sections 24A and 24C. Thus it will be appreciated that the enclosures 40 may be placed at any selected location beneath a room of a building.

Further advantages brought about by incorporating the present capping means 37 in the metal raceway section 24 will become apparent by inspection of FIG. 4. Many electrical codes require the power conductors to be maintained in a separate cell apart from the low-voltage signal, communications and telephone wiring. The telephone companies have required that their telephone wiring be maintained in a separate cell apart from the low-voltage signal wiring.

As shown in FIG. 4, the cell 32, labeled P, carries a power conductor 41 which extends through a first grommeted opening 42a in the crest 28 and through a first outlet fitting 43a attached to the enclosure 40. The power conductor 41 is shown connected to a load, such as a motor schematically illustrated at 44.

The cell 33, labeled T, carried telephone wiring 45 which extends through a second grommeted opening 42b in the crest 28 and through the second outlet fitting 43b attached to the enclosure 40. The telephone wiring 45 is shown connected to a telephone illustrated at 46.

The intermediate electrical passageway 38, labeled S, serves to convey low-voltage signal wiring 47 for operating fire alarms, burglar alarms and the like. The signal wiring 47 extends into the interior of the enclosure 40, out through the second outlet fitting 43b and is connected, for example, to an alarm illustrated at 48.

For the purpose of illustration, the metal raceway section 24 and the capping means 37 in FIG. 4, is shown covered by a layer of concrete 49 having an upper surface 50. It should be apparent from FIG. 4, that incorporation of the present capping means 37 in the metal raceway section 24, provides an additional unobstructed electrical passageway (passageway 38) which increases the wire carrying capacity of the metal raceway section 24. Moreover, the enclosure 40 permits access to be gained to the power, signal and telephone wiring 41, 47, 45 from above the floor level 50 at one location in the building floor.

COVER STRIP 39

Referring to FIG 6, the cover strip 39 includes a central pan 51 having longitudinal side portions 52 depending from the opposite longitudinal edges thereof. As shown in FIG. 5, the cover strip 39 is installed by introducing the side portions 52 into the lengthwise trough 35 and pressing downwardly until the central pan 51 is substantially flush with the spaced-apart crests 28. Connector means 53 is provided for connecting the cover strip 39 to the metal cellular raceway section 24. The connector means 53 may include embossments, such as rib segments 54 which are formed in the confronting sidewalls 30 of the cells 32, 33 and which project into the trough 35; and outwardly concave grooves 55 (FIG. 6) formed in the longitudinal side portions 52 of the cover strip 39. When the cover strip 39 is installed, the rib segments 54 engage the outwardly concave grooves 55. The rib segments 54 of each sidewall 30 may be aligned longitudinally of the trough 35, as shown in FIG. 2. The rib segments 54 of one sidewall 30 may be staggered with respect to the rib segments 54 of the opposite sidewall 30. Alternatively, a continuous rib 56 (FIG. 2) may be provided in each of the confronting sidewalls 30.

FIG. 7 illustrates a cover strip 39 installed in the lengthwise trough 35 of the metal raceway section 24. In this embodiment, an adhesive 57 interposed between the longitudinal side portions 52′ and the confronting sidewalls 30, serves to connect the cover strip 39′ to the metal cellular raceway section 24. The adhesive 57 may be replaced with or augmented with tack welds to secure the cover strip 39′ to the metal raceway section 24.

ENCLOSURE 40

Referring to FIGS. 5 and 8, the enclosure 40 includes a rectangular body portion 58 having a bottom wall 59 provided with a large opening 60, and a cover 61 secured to the body portion 58 by fasteners 62 threadedly engaged in tabs 63 extending from the body portions 58.

As best shown in FIG. 5, internally threaded collars 64 are secured to the cover 61 in registered relation with openings 65 provided in the cover 61. The collars 64 may be provided with a metal or plastic cap 66 to seal the enclosure 40.

Referring again to FIG. 8, a partition member 67 extends across the body portion 58 and has its ends captively retained between lugs 68 projecting from the rectangular body portion 58. The partition member 67 divides the interior of the enclosure 40 into two separate compartments. As shown in FIG. 4, the partition member 67 segregates the power conductors 41 from the low-voltage signal conductor 47 and the telephone wiring 45.

When the present capping means 37 is installed, as shown in FIG. 5, the cover strips 39 will have ends 69 extending beneath the enclosure 40. Accordingly, the enclosure of 40 (FIGS. 8—10) is additionally provided with stop means, such as webs 70 depending from the bottom wall 59 and positioned to be engaged by the cover strip ends 69. The enclosure 40 also is provided with connector means 71 for connecting the enclosure 40 to the cover strip ends 69 in electrically grounded relation therewith. The connector means 71 may comprise oppositely extending, reverse turned flanges 72 which cooperate with the bottom wall 59 to provide recesses 73 for receiving the cover strip ends 69. The flanges 72 terminate in lips 74 which facilitate entry of the cover strip ends 69. Plural tangs 75 are punched out of the reverse turned flanges 72 and extend toward the webs 70. The tangs 75 are positioned to engage the lower face of the cover strip web 51 and contact the same hereby electrically grounding the enclosure 40 to the cover strip 39. Moreover, the tangs 75 restrain the cover strips 39 from being disengaged from the enclosure 40. The enclosure 40 may, instead, be secured to the metal raceway section 24 by tack welds W shown in dotted outline in FIG. 5.

INSTALLATION OF CAPPING MEANS 37

The capping means 37 is installed as follows. Referring to FIGS. 5 and 9, one of the cover strips 39 is positioned between the confronting sidewalls 30. Adjustment in the position of that cover strip 39 relative to the metal raceway section 24 is accomplished by sliding that cover strip 39 along the trough 35. One of the enclosures 40 is then placed over the metal raceway section 24 with the webs 70 extending into the trough 35. The enclosure 40 is moved toward the previously installed cover strip 39 until the end 69 of the cover strip is received within the connector means 71. Thereafter, another cover strip 39 is positioned between the confronting sidewalls 30 and is moved longitudinally along the trough 35 until its end 69 is received in the connector means 71 on the opposite side of the enclosure 40. The cover strips 39 on the opposite sides of the enclosure 40 are firmly retained in place by the connector means 53. The enclosure 40 also is firmly connected to the successive cover plates 39 and is thereby firmly connected to the metal raceway section 24.

As can be seen in FIG. 5, the bottom wall 59 of the enclosure 40 overlies the spaced-apart crests 28 of the cells 32, 33. The opening 60 exposes portions of the crests 28 in which the grommeted openings 42a and 42b are provided. The adjacent ends 69 of the successive cover strips 39 are spaced apart thereby providing access from the interior of the lengthwise trough 35 to the interior of the enclosure 40.

It is to be understood at this time that the grommeted openings 42a, 42b may be provided in the field simply by removing the cover 61, forming the openings in the crests 28 and attaching the grommets thereto. Also, in the event any one of the enclosures 40 is to be activated at a later date, the collars 64 will be provided with the metal or plastic caps 66 to prevent ingress of the concrete. Where any particular enclosure 40 is to be placed in service immediately, the outlet fittings 43a, 43b (FIG. 4) may be attached to the collars 64 prior to pouring the concrete 49 (FIG. 4).

ALTERNATIVE EMBODIMENTS OF ENCLOSURE

Alternative embodiments of the present enclosure are illustrated in FIGS. 11, 12—14, 15—16, and 17. Corresponding numerals will be employed to identify corresponding parts heretofore described.

Referring to FIG. 11, the bottom wall 59 is provided with stop means, such as reverse turned wall portions 76 having edges 77 positioned for engagement by the ends 69 of the adjacent cover strips 39.

In FIGS. 12—14, inclusive, the enclosure 40 includes an inwardly projecting peripheral bottom wall 78 and transverse wall portions 79, 80 which cooperate to define openings 81, 82, 83. The openings 81, 82 expose portions of the crests 28 of the metal raceway section 24. The opening 83 provides communication between the interior of the trough 35 and the interior of the enclosure 40. The transverse wall portions 79, 80 are provided with opposed flanges 85 extending downwardly therefrom into the trough 35. The opposed flanges 85 are generally parallel with the confronting sidewalls 30 and have outwardly concave grooves 86 engaged over the rib segments 54 thereby connecting the enclosure 40 to the metal raceway section 24.

As best shown in FIG. 12, the rib segments 54 of one sidewall 30 are staggered with respect to the rib segments 54 of the opposite sidewall 30. The dimension of the opposed flanges 85 in the direction of the trough 35 preferably is such that each of the flanges 85 will engage at least one of the ribs 54.

In FIGS. 15, 16 there is illustrated an enclosure 40 having an inwardly extending peripheral bottom wall 78. A transverse bottom wall portion 80 cooperates with the peripheral bottom wall 78 to define separate openings 87, 88. The transverse wall portion 80 is provided with a depending flange 85 having an outwardly concave groove 86.

In this embodiment, a partition member 89 has its opposite ends captively retained by the lugs 68. Moreover, the partition member 89 is captively retained within the enclosure by the cover 61 (FIG. 16). The partition member 89 is provided with a shoulder which extends toward and is generally coplanar with the transverse bottom wall portion 80. The shoulder 90 terminates in a depending flange 91 having an outwardly concave groove 92.

The depending flanges 85, 91 are positioned to enter a lengthwise trough of a metal raceway section with the outwardly concave grooves 86, 92 engaged over embossments provided in the confronting sidewalls of adjacent cells, as described above.

In FIG. 17, the transverse bottom wall portion 80 includes the depending flange 85 having the outwardly concave groove 86. In this embodiment, the transverse bottom wall portion 79 is provided with a pair of depending flanges 93 each provided with an outwardly concave groove 94. The flanges 93 are spaced apart such that at least one of the flanges 93 will engage a rib segment 54 (FIG. 12).

As illustrated in FIG. 17, the partition member 67 may be provided with tangs 95 which contact the enclosure body 58 and temporarily retain the partition member 67 engaged with the lugs 68. The partition 67 may be displaced into the position shown in dash-dot outline in FIG. 4. With the partition member 67 thus positioned, communication is provided between the first outlet fitting 43a and the intermediate passageway 38 and the cell 33. Thus excess low voltage signal wiring or telephone wiring which cannot be accommodated by the second outlet fitting 43b may be accommodated by the first outlet fitting 43a.

I claim:

1. In a metal raceway section adapted to be embedded in a concrete floor construction, said raceway section having at least a pair of spaced, generally parallel cells, said cells presenting spaced-apart crests and an intermediate valley and confronting sidewalls connecting the spaced crests to said valley, said confronting sidewalls and said valley defining a lengthwise trough, the improvement comprising:

capping means enclosing said lengthwise trough to provide an unobstructed electrical passageway, said capping means comprising plural cover strips and at least one chamber-defining member interposed between a pair of said cover strips;

said chamber-defining member extending above said spaced-apart crests, spanning across said lengthwise trough and overlying said spaced-apart crests.

2. The improvement of claim 1 wherein said confronting sidewalls diverge outwardly from said adjoining valley to said spaced-apart crests.

3. The improvement of claim 1 wherein each of said cover strips includes a central pan flush with the spaced-apart crests of said cells.

4. The improvement of claim 1 wherein the opposite ends of said cover strips extend beneath chamber-defining members.

5. The improvement of claim 1 wherein said cover strips include:

a central pan and longitudinal side portions depending into said trough; and means connecting said cover strips to said metal raceway section.

6. The improvement of claim 5 wherein said connecting means includes:

each of said confronting sidewalls having embossments extending into said trough; and said side portions having outwardly concave grooves engaging said embossments.

7. The improvement of claim 1 wherein each of said chamber-defining members comprises:

an enclosure having a bottom wall overlying said spaced-apart crests and provided with at least one opening which exposes said spaced-apart crests to the interior of said enclosure and provides communication between the interior of said trough and the interior of said enclosure; and means connecting said enclosure to said metal raceway section.

8. The improvement of claim 7 wherein said connecting means comprises:

each of said confronting sidewalls having embossments extending into said trough; and opposed flanges depending from said enclosure into said trough, said opposed flanges being generally parallel with said confronting sidewalls and having outwardly concave grooves engaging said embossments.

9. The improvement of claim 8 wherein said opposed flanges adjoin said bottom wall.

10. The improvement of claim 8 including a vertically presented divider plate captively retained within said enclosure above one of said spaced-apart crests and extending parallel with said cells;

one of said opposed flanges adjoining said divider plate, and the other of said opposed flanges adjoining said bottom wall.

11. The improvement of claim 7 wherein said connecting means comprises:

a pair of oppositely extending, reverse turned flanges depending from said bottom wall and extending transversely across said trough, said reverse turned flanges cooperating with said bottom wall to define recesses captively retaining end portions of said cover strip.

12. The improvement of claim 11 wherein each of said reverse turned flanges is provided with tangs frictionally engaging said end portions.